US 9,810,782 B2

United States Patent
Schiffmann

(10) Patent No.: US 9,810,782 B2
(45) Date of Patent: Nov. 7, 2017

(54) VEHICLE RADAR SYSTEM WITH IMAGE REFLECTION DETECTION

(71) Applicant: DELPHI TECHNOLOGIES, INC., Troy, MI (US)

(72) Inventor: Jan K. Schiffmann, Newbury Park, CA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 347 days.

(21) Appl. No.: 14/664,420

(22) Filed: Mar. 20, 2015

(65) Prior Publication Data

US 2016/0274232 A1    Sep. 22, 2016

(51) Int. Cl.
*G01S 13/93* (2006.01)
*G01S 7/41* (2006.01)
*G01S 13/87* (2006.01)

(52) U.S. Cl.
CPC ............ *G01S 13/931* (2013.01); *G01S 7/415* (2013.01); *G01S 13/87* (2013.01); *G01S 2013/9317* (2013.01); *G01S 2013/9332* (2013.01); *G01S 2013/9378* (2013.01); *G01S 2013/9385* (2013.01)

(58) Field of Classification Search
CPC ........ G01S 13/931; G01S 7/415; G01S 13/87; G01S 2013/9378; G01S 2013/9317; G01S 2013/9332; G01S 2013/9385
See application file for complete search history.

(56) References Cited

U.S. PATENT DOCUMENTS

| 6,664,918 | B2 * | 12/2003 | Paradie | ................... G01S 7/412 342/118 |
| 6,674,394 | B1 | 1/2004 | Zoratti | |
| 8,072,352 | B2 * | 12/2011 | Reed | ..................... G01S 13/931 340/435 |
| 2003/0179129 | A1 | 9/2003 | Tamatsu et al. | |
| 2008/0186204 | A1 | 8/2008 | Buckley | |
| 2008/0211644 | A1 * | 9/2008 | Buckley | ............... B62D 15/027 340/435 |
| 2009/0079986 | A1 | 3/2009 | Haag et al. | |
| 2009/0167514 | A1 * | 7/2009 | Lickfelt | ................. G01S 13/87 340/435 |
| 2013/0314272 | A1 | 11/2013 | Gross et al. | |

(Continued)

FOREIGN PATENT DOCUMENTS

DE    WO 2014075936 A1 *  5/2014 ............ B60Q 9/006
JP    2009 079917 A    4/2009

*Primary Examiner* — Matthew M Barker
(74) *Attorney, Agent, or Firm* — Lawrence D. Hazelton

(57) ABSTRACT

A radar system suitable for use on a vehicle and configured to detect a false radar-track arising from a reflection of a radar return from a target includes a first sensor, a second sensor, and a controller. The first sensor outputs a first signal indicative of a first target in a first area proximate to a vehicle. The second sensor outputs a second signal indicative of a second target in a second area proximate to the vehicle and different from the first area. The controller receives the first signal and the second signal. The controller determines that the second target is a reflection of the first target when a reflection-line that bisects and extends orthogonally from a line-segment extending between the first target and the second target intersects with a reflection surface detected by the second sensor.

4 Claims, 3 Drawing Sheets

(56) References Cited

U.S. PATENT DOCUMENTS

2014/0118130 A1* 5/2014 Chang .................... G08G 1/163
340/435
2015/0331098 A1* 11/2015 Luebbert ................ G01S 7/354
342/91
2016/0116585 A1* 4/2016 Fukuman .............. G01S 15/931
367/99

* cited by examiner

VEHICLE RADAR SYSTEM WITH IMAGE REFLECTION DETECTION

TECHNICAL FIELD OF INVENTION

This disclosure generally relates to a radar system suitable for use on a vehicle, and more particularly relates to a system configured to detect a false radar-track arising from a reflection of a radar return from a target.

BACKGROUND OF INVENTION

It is known to equip a vehicle with a Rear/Side Driver Support (RSDS) system that uses two complementary wide field-of-view radar sensors, one mounted on each of the rear corners of the vehicle, i.e. the host vehicle. These complementary sensors can support several useful alert features for the driver including a Rear Crossing Traffic Alert (CTA). This feature warns the driver of approaching crossing traffic in situations like backing out of a driveway into a street or backing out of a parking space in a parking lot.

In the parking lot scenario, it is not unusual for other vehicles to be parked in one or both of the parking spaces adjacent to the host vehicle. The somewhat planar metallic side surface of an adjacent vehicle in an adjacent parking space can act as a reflective surface for the radar energy (like a mirror). Just as a viewer would be able to see a visual reflection of a crossing vehicle in a mirror, the RSDS sensor next to the adjacent vehicle can 'see' a reflection of a crossing vehicle that is actually on the other side of the host vehicle. Because of this, the CTA alert feature may sound a false warning indicating that, for example, a crossing vehicle is approaching from the right side when there is actually nothing but a crossing vehicle approaching from the left side.

SUMMARY OF THE INVENTION

In accordance with one embodiment, a radar system suitable for use on a vehicle and configured to detect a false radar-track arising from a reflection of a radar return from a target is provided. The system includes a first sensor, a second sensor, and a controller. The first sensor outputs a first signal indicative of a first target in a first area proximate to a vehicle. The second sensor outputs a second signal indicative of a second target in a second area proximate to the vehicle and different from the first area. The controller receives the first signal and the second signal. The controller determines that the second target is a reflection of the first target when a reflection-line that bisects and extends orthogonally from a line-segment extending between the first target and the second target intersects with a reflection surface detected by the second sensor.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is a radar system that overcomes the problems described above by performing tests on signals received from complementary radar sensors mounted on a vehicle.

Figure 1:
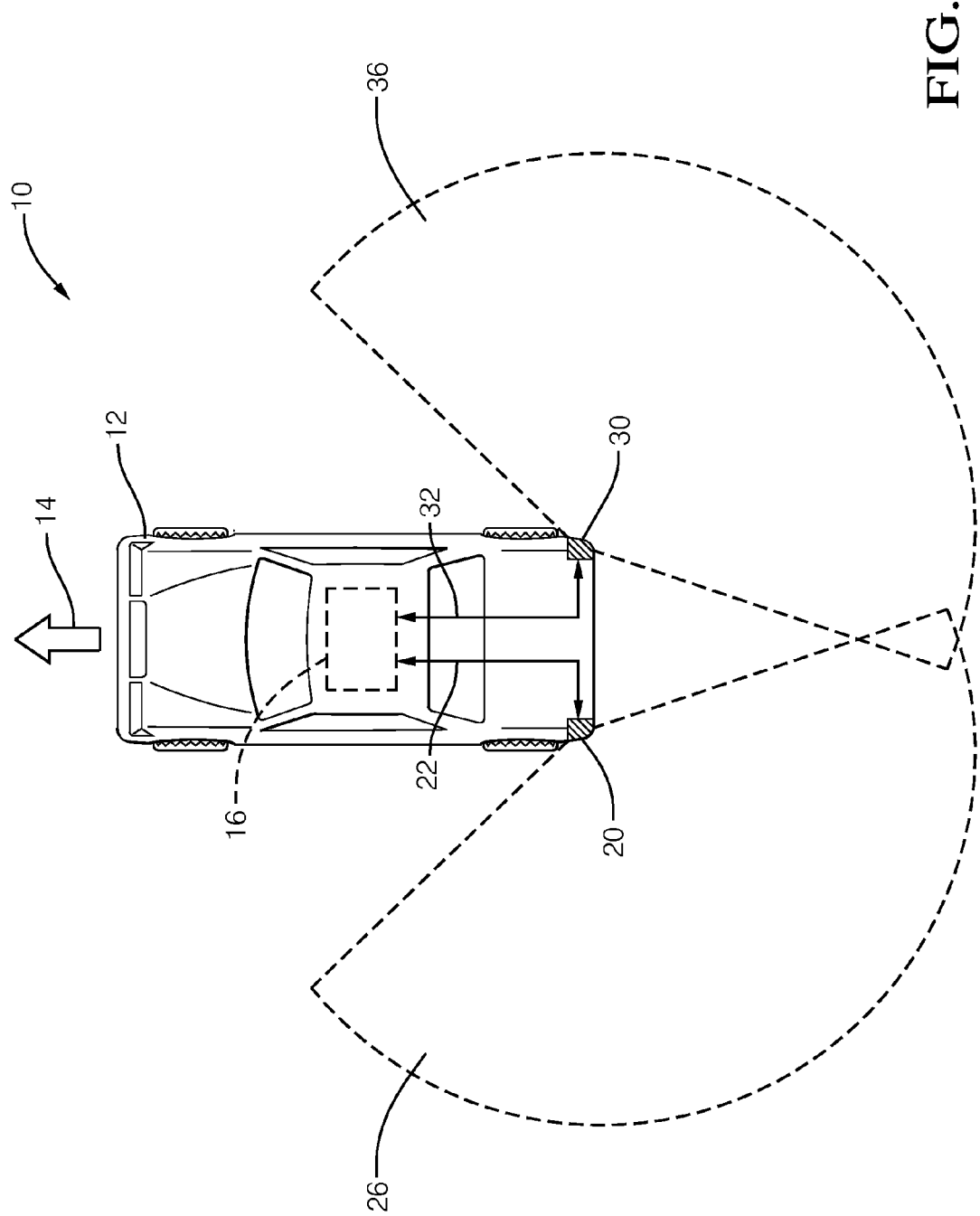
FIG. 1 is a top view of a vehicle equipped with a radar system in accordance with one embodiment.

FIG. 1 illustrates a non-limiting example of a radar system, hereafter the system 10. In general, the system 10 is suitable for use on a vehicle 12 to detect an object such as a moving vehicle approaching the vehicle 12; see FIG. 2 for example. For the purpose of explanation, the forward direction of travel of the vehicle 12 is indicated by the arrow 14. As such, any references to the vehicle 12 traveling backward, i.e. backing-up or backing out of a parking space, are understood to mean in a direction opposite of the arrow 14.

The system 10 includes at least two distinct radar sensors: a first sensor 20 that outputs a first signal 22 indicative of a first target 24 (FIG. 2) in a first area 26 proximate to the vehicle 12; and a second sensor 30 that outputs a second signal 32 indicative of a second target 34 in a second area 36 proximate to the vehicle 12. By way of example and not limitation, the first sensor 20 and the second sensor 30 are shown mounted, respectively, on the back-left corner and back-right corner of the vehicle 12. The system 10 may include other radar sensors mounted toward the front of the vehicle 12 or along the side of the vehicle 12, and these additional sensors may also be used to determine the presence of objects proximate to the vehicle 12.

The first sensor 20 and the second sensor 30 are configured so that the second area 36 is distinct or different from the first area 26. That is, the first area 26 and the second 36 are not the same or even substantially the same. While it is allowable for the first area 26 to partially overlap the second area 36 as illustrated in FIG. 1, this is not a requirement of the system 10. However, in order to minimize the amount of redundant signal processing performed, it is preferable that the overlap area be less than, for example, 50% of the first area 26 or the second area 36. If the first area 26 overlaps the second area 36 by more than 80% for example, then that would be deemed as being substantially the same, i.e. not different.

The system 10 may include a controller 16 that receives the first signal 22 and the second signal 32 from the first sensor 20 and the second sensor 30, respectively. The controller 16 may include a processor (not shown) such as a microprocessor or other control circuitry such as analog and/or digital control circuitry including an application specific integrated circuit (ASIC) for processing data as should be evident to those in the art. The controller 16 may include memory, including non-volatile memory, such as electrically erasable programmable read-only memory (EEPROM) for storing one or more routines, thresholds and captured data. The one or more routines may be executed by the processor to perform steps for determining if signals received by the controller 16 indicate that one or more targets are proximate to the vehicle 12 as described herein.

Figure 2:
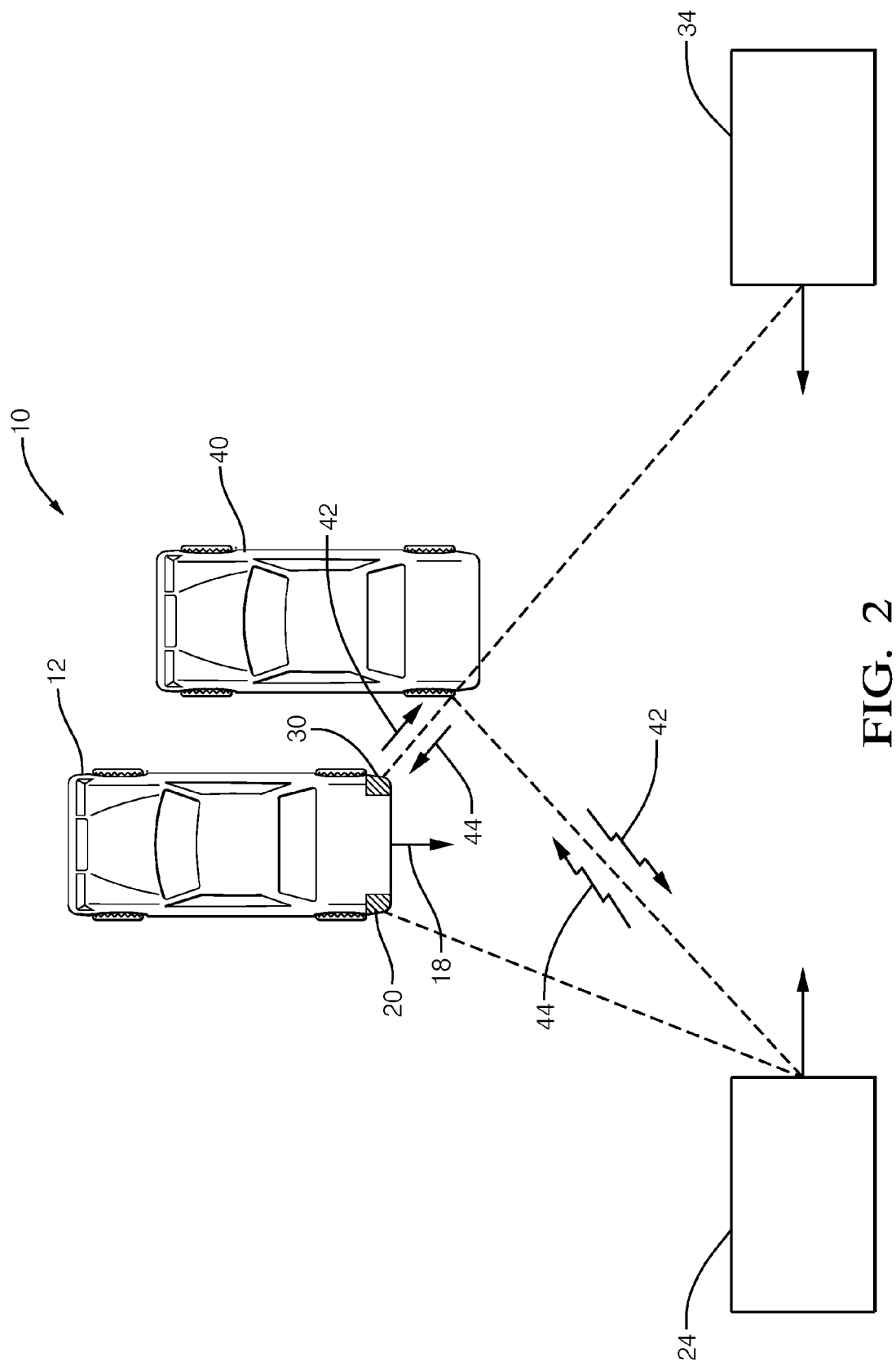
FIG. 2 is top view of a situation where a radar return from a first target is reflected to a system of FIG. 1 in accordance with one embodiment.

FIG. 2 illustrates a non-limiting example of a situation where the vehicle 12 is backing as indicated by arrow 18. As may happen in a parking lot where vehicles are parked at an angle, including a right-angle, relative to a roadway or isle of a parking lot, the vehicle 12, i.e. the host vehicle, may be located beside an adjacent vehicle 40 in an adjacent parking space next to the vehicle 12. Alternatively, the vehicle 12 may be parked next to a building or other object. Whether it is by an adjacent vehicle 40 or some other object/structure, the radar signal 42 emitted by the second sensor 30 may be reflected by the adjacent vehicle 40 (or other object/structure) toward the first target 24, and the return signal 44 may be reflected along the same path back to the second sensor 30, which may cause the system 10 to perceive that the second target 34 is present when it is actually just a ghost or false-reflection of the first target 24. That is, due to the reflection by the adjacent vehicle 40, a system without the improvement described below may indicate that two targets are approaching the vehicle 12 from opposite directions, when in fact only the first target 24 is present and the second target 34 is really a false-reflection of the first target 24. It is contemplated that the adjacent vehicle 40 may also be moving when the vehicle 12 is backing, or the vehicle 12 may be motionless with the system 10 activated, and only the adjacent vehicle 40 is moving.

Figure 3:
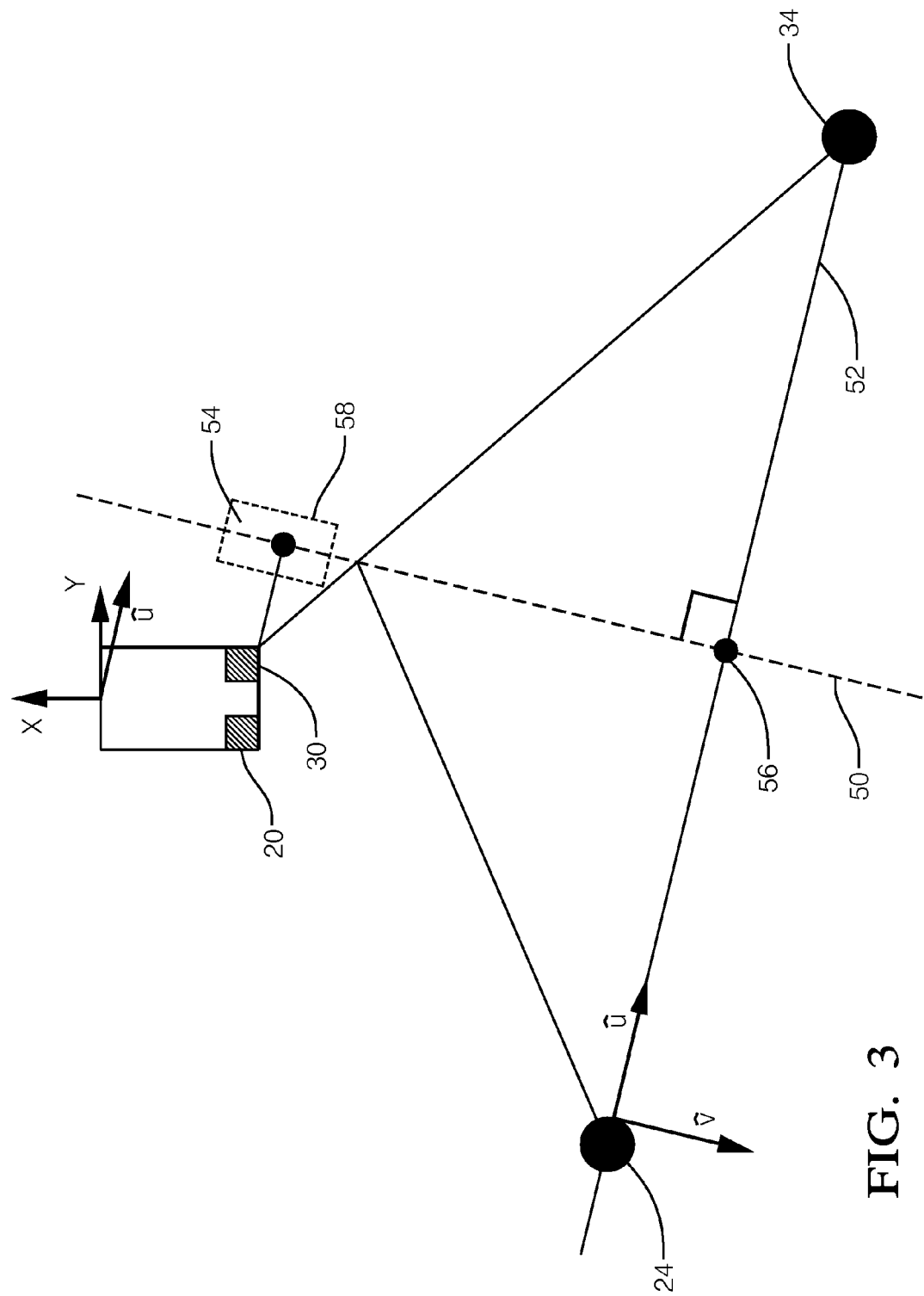
FIG. 3 is a diagram of how a second target is determined to be a reflection of a first target by the system of FIG. 1 in accordance with one embodiment.

FIG. 3 further illustrates a non-limiting example of how the system 10, or more specifically the controller 16, is configured to overcome this problem. As will be explained in more detail, the system 10 is configured to detect a false radar-track arising from a reflection of a radar return (the return signal 44) from a target (the first target 24) by determining or indicating that the second target 34 is a reflection of the first target 24 when a reflection-line 50 that bisects and extends orthogonally from a line-segment 52 extending between the first target 24 and the second target 34 intersects with a reflection surface 54 detected by the second sensor 30. That is, the system 10 determines the location of the first target 24 and the apparent location of the second target 34, and defines the line-segment 52 based on estimates of the locations of the targets relative to the vehicle 12. Then, from a mid-point 56 of the line-segment 52, the reflection-line 50 is defined that is orthogonal (i.e. perpendicular or normal) to the line segment 52. Then the system 10 searches for the reflection surface 54 within a box 58 around a location on the reflection-line 50 and close to the second sensor 30. If the reflection surface is found and the reflection-line 50 intersects the reflection surface 54, or at least intersects the box 58, then the system 10 has sufficient evidence to determine that the second target 34 indicated by the second signal 32 is not actually a target, but is a false reflection of the first target 24 reflected by the reflection surface 54.

In an alternative embodiment of the system 10, the controller 16 may be further configured to determine that the second target 34 is a reflection of the first target 24 when the first signal 22 and the second signal 32 indicate that the first target 24 and the second target 34 are traveling in opposite directions, or nearly opposite directions, at approximately the same speed. It is recognized that an actual object (e.g. the first target 24) may not be traveling in a direction orthogonal to the reflective-line 50, i.e. the reflection surface 54, so the velocity vectors of the first target 24 and the second target don't necessarily point in exactly opposite directions. However, there is generally a component of the velocity vectors orthogonal to the reflection surface 54 which should be equal and opposite, and a component parallel to the reflection surface 54 that should be equal and in same direction.

To summarize the description of the system described so far, the system 10 provides a way to identify false radar tracks arising due to reflection of the transmitted/received radar signals. An example where the teaching of the system 10 is useful is a Rear/Side Driver Support (RSDS) system in which a pair of RSDS sensors is mounted on the rear corners of a host vehicle. The reflections cause a false alert problem when using the Cross Traffic Alert (CTA) function.

In a typical scenario, the host vehicle is parked next to another vehicle in a parking lot-style parking scene. In CTA, if a moving vehicle comes from one side of the host vehicle, the sensor on that rear corner (the first sensor 20) should detect the moving vehicle (the first target 24) and, when appropriate, signal an alert. When the false-reflection issue occurs, the other sensor (the second sensor 30) sees a radar reflection of the first target in the body panel of an adjacent vehicle 40 and falsely signals an alert indicating a vehicle approaching from that side (the right side).

In the parking lot scenario, it is not unusual for an adjacent vehicle 40 to be parked in one or both of the parking spaces adjacent to the vehicle 12. The somewhat planar metallic side surface of a vehicle in an adjacent parking space can act as a reflective surface for the radar energy (like a mirror). Just as a viewer would be able to see a visual reflection of a crossing vehicle in a mirror, the RSDS sensor next to that adjacent vehicle can 'see' a reflection of a crossing vehicle which is actually on the other side of the vehicle 12. The second sensor 30 generally cannot determine by itself that what it is seeing is a reflection. Because of this, the CTA alert feature in prior systems may sound a false warning that, for example, a crossing vehicle is approaching from the right side when there is actually nothing but a crossing vehicle approaching from the left side.

The correct way to classify the second target 34 indicated in the radar track of the second signal 32 as a Reflection (and thus allowing the alert to be suppressed) is to use properties of reflections along with the radar tracks from the other sensor which can see the true object directly (i.e., without reflection). The relevant geometry for doing this is depicted in FIG. 3. In particular, note that the line segment connecting the positions of the true object (the first target 24) and the apparent object (the second target 34) is bisected by the reflection-line 50 which is orthogonal to the reflection-line 50.

By way of example and not limitation, assume that the vehicle 12 is either stationary or moving slowly (e.g., backing out of a parking space). Also assume that both the Direct track present in the first signal 22 and Reflection track present in the second signal 32 are tracking the center front of the first target 24. Under these assumptions, the Direct and Reflection tracks should be moving at approximately the same over-the-ground (OTG) speed. They should also be equidistant from the reflective surface defined by the reflection-line 50, and the line-segment 52 connecting the two tracks should be orthogonal to that reflective surface. These assertions are consistent with well-known properties of an ideal planar reflective surface.

If the two candidate tracks meet these assumptions, the position and orientation of the reflection-line 50 is determined to be the perpendicular bisector of the line-segment 52 connecting the two tracks. The RSDS sensor which is apparently seeing the reflection is then determined. This is done by determining on which side of the host vehicle the reflective surface appears to be. This reflection-sensing sensor determination is then confirmed by checking the absolute value of the VCS (vehicle coordinate system, see x and y vectors FIG. 3) lateral position coordinates of the two tracks (the reflection is expected to be bigger in this sense). There is also a check to make sure that the two tracks are either both moving toward or both moving away from the reflective surface.

If all of the above conditions are satisfied, then the raw radar detections may be checked to see if there are any stationary detections on the reflective surface. If the reflective surface is planar, such detections would be expected to be in the vicinity of the closest point on the reflective surface to the reflection-sensing sensor, due to the orthogonality of the radar 'beam' to the surface at that point. The closest point on the reflection surface 54 is computed, and the raw detections are checked to see if there are any stationary detections in the box 58 around that closest point.

If a stationary detection is found on the estimated reflective surface, then the 'probability of reflection' is increased for the suspected reflection track. Otherwise, that probability decays toward zero. For each track, the probability of reflection is compared to a pair of hysteresis thresholds to determine the value of the 'f_reflection' flag, which indicates a belief in the direct/reflection class to which that track belongs. If the probability is larger than the upper threshold, then the reflection flag is set to True. If the probability is smaller than the lower threshold, then the reflection flag is set to False. If the probability is between the two thresholds, then the flag maintains its current value.

Referring again to FIG. 3, the two red dots designated as the first target 24 and the second target 34 correspond to the two candidate object tracks. The reflection surface 54 is the perpendicular bisector of the line-segment 52 connecting the two tracks. The reflective surface is represented by a unit vector $\hat{u}$, and a distance from the VCS origin to the reflective barrier $d_{bar}$. The points (x,y) on the reflective surface satisfy Eq. 1 as follows—

$$\hat{u}^T \begin{bmatrix} x \\ y \end{bmatrix} = d_{bar}.$$ Eq. 1

The mid-point 56 is located at the arithmetic mean of the two candidate track positions. The unit vector $\hat{u}$ is calculated by finding the vector from one of the tracks to the mean point, then normalizing the length of that vector to have a magnitude of 1. Since the mean point is on the reflective surface, the value of $d_{bar}$ can be found as shown in Eq. 2 as follows—

$$d_{bar} = \hat{u}^T \begin{bmatrix} x_{mean} \\ y_{mean} \end{bmatrix}.$$ Eq. 2

The quantities $\hat{u}$ and $d_{bar}$ are both negated, if necessary, to make $d_{bar}$ a positive number. This ensures that when $\hat{u}$ is placed at the VCS origin, it points toward the reflective surface, instead of away from it.

The constraint that the two tracks are either both moving toward or both moving away from the reflective surface is enforced by Eq. 3 making sure that—

$$(\hat{u}^T \overline{v_1})(\hat{u}^T \overline{v_2}) < 0$$ Eq. 3 where $\overline{v}_1$ and $\overline{v}_2$ are the VCS OTG velocity (column) vectors of the two candidate tracks. Each term in parentheses in the above expression is the component of one of the candidate tracks in a direction orthogonal to the reflective surface. If one is positive and the other is negative, then the condition is satisfied.

Next, the reflection-sensing sensor is determined. This is determined by calculating the VCS lateral coordinate (y) of the intersection of the estimated reflective surface (black dashed line in figure above) with the line connecting the two sensors. One would expect this point to be to either the left or right side of the vehicle, not in-between the two sensors, but this isn't checked in the current algorithm. Only the sign of that lateral coordinate is used. The left sensor is selected as the reflection-sensing sensor if the lateral coordinate is negative, otherwise the right sensor is selected. The expression for the lateral coordinate is given in Eq. 4 as follows—

$$y = \frac{1}{u_y}(d_{bar} - u_x x_{mount}),$$ Eq. 4 where $u_x$, $u_y$ are the components of the unit vector $\hat{u}$, and $x_{mount}$ are the VCS longitudinal coordinate of the sensor mounting positions (assumed to be the same for both sensors). In the expression above, all that is actually needed is the sign of y, so the division by $u_y$ is replaced by a multiplication in the C code. As noted in the previous section, this determination of the reflection-sensing sensor is then confirmed by making sure that the absolute value of the presumed reflection track's VCS lateral coordinate is larger than that of the presumed direct track.

The next step is to determine the closest point on the estimated reflective surface to the reflection-sensing sensor. This point is in the direction of $\hat{u}$ from the sensor's mounting position. Measuring from the VCS origin, the reflective surface is a distance $d_{bar}$ in the direction given by $\hat{u}$. The sensor is, according to Eq. 5, a distance—

$$d = \hat{u}^T \begin{bmatrix} x_{sensor} \\ y_{sensor} \end{bmatrix},$$ Eq. 5 from the VCS origin in the direction given by $\hat{u}$. So the closest point is given by Eq. 6 as follows—

$$\begin{bmatrix} x_{closest} \\ y_{closest} \end{bmatrix} = \begin{bmatrix} x_{sensor} \\ y_{sensor} \end{bmatrix} + (d_{bar} - d)\hat{u}.$$ Eq. 6

Once the position of the closest point on the reflective surface has been determined, it is a simple matter to compute a rectangle of interest aligned with the reflective surface inside which to look for stationary detections. This involves computing the vector from the closest point to the detection being tested, and seeing if the absolute values of the dot product of that vector with $\hat{u}$ and $\hat{v}$ are smaller than some thresholds. Here, $\overline{v}$ is a unit vector orthogonal to $\hat{u}$, in other words, parallel to the estimated reflective surface; see FIG. 3.

If a stationary detection is found inside the box, it is taken as sufficient evidence of the existence of the hypothesized reflective surface. In that case, the probability of reflection is increased for the presumed reflection track. As described in the previous section, this probability is then compared to a couple of thresholds to determine the direct/reflection class of the track.

This algorithm works on grouped object tracks, as opposed to raw detections or 'tracklets'. If it worked on raw detections instead, there would be a processing load reduction when these detections were discarded. A few reasons why it makes sense to use the grouped object tracks instead of raw detections include the following. 1) Tracks have more persistence than detections and don't jump around as much. Since the scheme requires current data from both direct and reflected objects, many of the reflection detections would not be flagged because of lack of a matching detection on the true object. 2) Tracks have speed. The similar-speed requirement would be difficult to implement using raw detections. One could require similar range rates when comparing detections from the direct and reflected objects, but the range rate is less informative in crossing scenarios than the speed derived over time from watching the movement of detection positions. Typically, there are significantly fewer object tracks than detections, making it easier to 'get' all of them. Also, fewer candidate pairs are required to be tested when looking at grouped objects compared to looking at detections.

The grouped object tracks should be in the same place on the near face of the object. The raw detections could come from anywhere on the object, making it more difficult to match them to detections on the other object. It is recognized that empirical testing will be necessary to optimize the system 10 for the vehicle 12 on which it is installed, and for test scenarios specified by potential customers.

Accordingly, a radar system (the system 10), and a controller 16 suitable for use on a vehicle configured to detect a false radar-track arising from a reflection of a radar return from a target is provided. The teachings of the system 10 are particularly well-suited for use on a Rear/Side Driver Support (RSDS) system.

While this invention has been described in terms of the preferred embodiments thereof, it is not intended to be so limited, but rather only to the extent set forth in the claims that follow.

I claim:

1. A radar system suitable for use on a vehicle, said system comprising:
   a first radar sensor configured to output a first signal indicative of a first target in a first area proximate to a vehicle;
   a second radar sensor configured to output a second signal indicative of a second target and a reflection surface in a second area proximate to the vehicle and different from the first area, wherein the reflection surface is characterized as being closer to the second radar sensor than the second target; and
   a controller that receives the first signal and the second signal, wherein the controller is configured to determine that the second target is a reflection of the first target when a reflection-line that bisects and extends orthogonally from a line-segment extending between the first target and the second target intersects with the reflection surface detected by the second sensor.

2. The system in accordance with claim 1, wherein the controller is also configured to determine that the second target is a reflection of the first target when the first signal and the second signal indicate that the first target and the second target are traveling in opposite directions at the same speed.

3. The system in accordance with claim 1, wherein the first sensor is mounted proximate to the back-left corner of the vehicle, and the second sensor is mounted proximate to the back-right corner of the vehicle.

4. The system in accordance with claim 1, wherein the first area does not substantially overlap the second area.

* * * * *